United States Patent
Ahrens

(12) United States Patent (10) Patent No.: US 6,502,642 B2
Ahrens (45) Date of Patent: Jan. 7, 2003

(54) TOOL AND METHOD FOR TRIMMING AND SHOEING A HOOF

(76) Inventor: Gaylord L. Ahrens, 8680 Rebecca Park Trail, Rockford, MN (US) 55373

( * ) Notice: Subject to any disclaimer, the term of this patent is extended or adjusted under 35 U.S.C. 154(b) by 3 days.

(21) Appl. No.: 09/829,771

(22) Filed: Apr. 10, 2001

(65) Prior Publication Data

US 2002/0144823 A1 Oct. 10, 2002

(51) Int. Cl.[7] .................................................. A01L 11/00
(52) U.S. Cl. ............................ 168/45; 168/48.1; 33/195
(58) Field of Search ................. 168/1, 24, 45, 168/48.1; 33/195, 511

(56) References Cited

U.S. PATENT DOCUMENTS

| | | | |
|---|---|---|---|
| 616,256 A | * 12/1898 | Platt | 33/195 |
| 832,060 A | * 10/1906 | Holmquist | 33/195 |
| 4,214,370 A | 7/1980 | Beaston | 168/45 |
| 4,227,311 A | * 10/1980 | Beheny | 33/195 |
| 4,813,148 A | 3/1989 | Finnegan | 33/195 |
| 5,027,520 A | 7/1991 | Finnegan | 33/195 |
| 5,319,918 A | 6/1994 | Baur et al. | 59/61 |
| 5,736,656 A | * 4/1998 | Fullen et al. | 73/865.4 |
| 5,996,698 A | 12/1999 | Behney | 168/48.1 |

OTHER PUBLICATIONS

Stephen E. O'Grady, Shoeing The Laminitic Horse. Annual Veterinarian and Farrier Conference, University of Minnesota, St. Paul, MN. Apr., 2000.

* cited by examiner

*Primary Examiner*—Charles T. Jordan
*Assistant Examiner*—Elizabeth Shaw
(74) *Attorney, Agent, or Firm*—Walter K. Roloff

(57) ABSTRACT

A diagnostic tool for use in trimming and shoeing a hoof includes a substantially planar base having a top surface and a bottom surface. A heel member is coupled to the base. At least one radio-opaque marker is rigidly coupled to said top surface of said base. In use, a hoof is positioned on the base, with the hoof resting on the top surface and a heel portion of the hoof placed against the heel member. A side view radiographic image of the hoof positioned on the base is made, with the at least one radio-opaque marker being visible therein. Accurate hoof measurements and location determinations may then be obtained, with reference to the at least one radio-opaque marker in the radiographic image.

6 Claims, 2 Drawing Sheets

TOOL AND METHOD FOR TRIMMING AND SHOEING A HOOF

FIELD OF THE INVENTION

The present invention relates generally to diagnostic tools for use relative to a hoof. The present invention relates specifically to a diagnostic tool for use in therapeutically trimming and shoeing a hoof, and to a method for use of such a tool.

BACKGROUND OF THE INVENTION

Properly trimming and shoeing the hooves of animals, and in particular those of horses, has been the art and science of farriers.

The farrier trade is one which has generally required a high degree of skill and expertise to custom-form shoes for horses depending upon the physiological needs of the animal. Farriers typically work in concert with veterinarians to correct pathological conditions in horses through various therapeutic horse shoe styles and constructions, such as heart-bar shoes, egg-bar shoes, heel calks, trailers, trailers with heel calks, and other such variations in the shoes.

In a case of a significant pathological condition such as laminitis or founder, re-alignment of the hoof by changing its pitch or internal angulation and associated skeletal conformation is often prescribed. To this end, simple hoof trimming techniques have been proposed such as the so-called "wild horse four-point trim." This technique, used in combination with plastic hoof pads, frog pressure members, plastic heel inserts, and adhesives to join these components to the hoof and/or shoe, are believed to alleviate founder.

Aside from relatively simple trimming techniques alone, re-alignment of the hoof in a foundering animal has also been achieved by way of selected trimming in combination with therapeutic shoeing. Primary objects of therapeutic shoeing are to protect the hoof, minimize break-over, relieve dorsal hoof wall pressure, prevent sole pressure, and provide posterior support by way of frog and heel portions of the hoof.

In practice, having diagnosed a foundering condition by way of on-site observation of the animal and examination of any number of radiographs taken of an area about the hoof (typically a hoof side-view profile) a veterinarian might request, for example, that a farrier "shorten the toe and lower the heel" to effect a therapeutic pressure change upon and within the hoof.

In general, trimming and shoeing opinions and techniques vary widely among veterinarians and farriers, between each other and also within their respective professions. These equine professionals must consider radiographs in light of biomechanical forces exerted on a hoof, to achieve a successful therapeutic outcome through properly trimming and shoeing the hoof pursuant to the radiograph interpretation. Consequently, it is of utmost importance that veterinarians and farriers are able to communicate with a modicum of precision regarding hoof measurements in undertaking therapeutic trimming and shoeing. Moreover, farriers must be able to accurately locate areas about the hoof in trimming and shoeing thereof, pursuant to diagnostic communications with the veterinarian.

In response to these needs, various measuring and locating techniques have been proposed, ranging from simply taking measurements about the hoof with a ruler and marking the hoof with a pen, to other more elaborate devices. Such devices are disclosed, for instance, in U.S. Pat. No. 4,214,370 entitled HOOF ALIGNMENT TOOL issued to Beaston, and in U.S. Pat. Nos. 4,813,148 and 5,027,520 entitled, respectively, INSTRUMENT FOR AIDING IN PROPER[L]Y SHOEING A HORSE and FARRIER'S INSTRUMENT issued to Finnegan.

The Beaston and Finnegan patents rely upon readings obtained from mechanical devices placed against the hoof. Such readings are prone to errors resulting from, for example, inconsistent or inaccurate placement of the device or even inaccuracy of observation of the readings (as may be experienced by a farrier attempting to use the device in the field with an agitated, distressed horse).

In another measuring technique, a radio-opaque marker such as a wire or tack has been proposed in combination with a radiograph, for obtaining measurements in fitting a shoe to a hoof. However, a lack of uniformity in placement of the marker makes this technique subject to several errors, in practice.

Thus, there exists a need for a tool that does not suffer the numerous drawbacks of the known devices and techniques. Additionally, there exists a need for a tool that ensures uniformity in hoof measurements and location determinations, such that subjective radiographic interpretations are minimized and objective or quantitative interpretations are maximized. Furthermore, there exists a need for a tool which assists veterinarians and farriers in their diagnostic communications, inter alia.

SUMMARY OF THE INVENTION

An object of the present invention is to provide a diagnostic tool that aids a farrier in properly trimming a hoof.

Another object of the present invention is to provide a diagnostic tool that aids a farrier in properly shoeing a hoof.

A further object of the present invention is to provide a diagnostic tool that ensures uniformity in hoof measurements and location determinations.

In accordance with the present invention, a diagnostic tool includes a base having a top surface and a bottom surface. A heel member is rigidly fastened to the base, such that an obtuse angle is formed therebetween. Equally spaced radio-opaque markers are provided in the top surface of the base. In use of the diagnostic tool a hoof is placed on the top surface of the base, with a heel portion of the hoof placed against the heel member of the base. A side view radiograph is then made of the hoof resting on the base of the tool. Examination of the radiograph image then shows the hoof and its internal and skeletal structure, along with the radio-opaque markers. Accurate hoof measurements and location determinations may then be made by a veterinarian and a farrier.

The diagnostic tool of the present invention provides a classic example of necessity being the mother (or, dam) of invention. Among its radiographic uses, the tool specifically permits an immediate application in an emergency or time-critical situation; e.g., instances of severe laminitis, and bowed or severed tendons.

DETAILED DESCRIPTION OF THE INVENTION

Throughout this exposition, the words "horse" and "equine" are intended to include any animal having a hoof that may be trimmed, shod, or otherwise examined or pathologically diagnosed by a veterinarian or farrier. Likewise, the word "farrier" here throughout is intended to include all blacksmiths, horseshoers, veterinarians, and other persons engaged in trimming, shoeing, examining, or making a pathological diagnosis upon a hoof of an animal.

Figure 1:
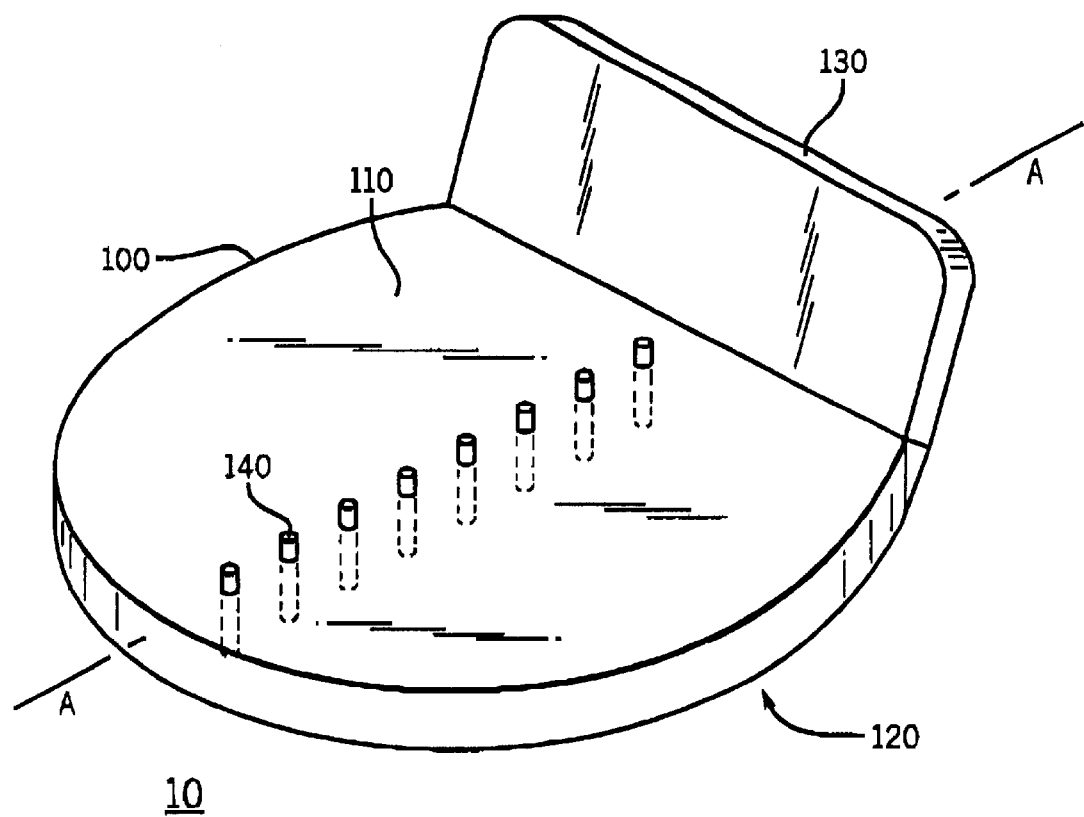
FIG. 1 is a perspective illustration of a diagnostic tool constructed in accordance with the present invention.

Referring to FIG. 1, thereshown is a perspective illustration of an exemplary embodiment of a diagnostic tool 10 of the present invention.

In FIG. 1, diagnostic tool 10 preferably includes a generally oval or horseshoe-shaped and substantially planar base 100. Base 100 includes a top surface 110 and a bottom surface 120. A longitudinal centerline reference axis A—A is depicted as passing longitudinally through base 100. It is to be understood that base 100 is provided to be substantially axially symmetric about axis A—A. A generally rectangular heel member 130 is rigidly fastened to base 100 at one end thereof along an edge portion of member 130. In this arrangement heel member 130 is also substantially axially symmetric about axis A—A. An angle of about 120 deg. is preferably formed between base 100 and heel member 130, as will be further described in use of tool 10. Although not specifically illustrated, the fastening of member 130 to base 100 may be achieved by way of, for example, a fast bonding ethyl cyanoacrylate single-component adhesive.

Preferably, both base 100 and heel member 130 are constructed from commercially available ¼" thick Lexan® brand durable plastic sheet material manufactured by GE Structured Products of Pittsfield, Mass. This preferred plastic sheet material for base 100 and heel member 130 may be readily fabricated into the respective shapes by any suitable method such as band-saw cutting.

Also in FIG. 1, radio-opaque markers 140 are rigidly coupled to top surface 110 of base 100. Preferably, markers 140 comprise individual cylindrical steel pegs having a diameter of about 1/16". Markers 140 are coupled to top surface 110 of base 100 along axis A—A such that they protrude about ⅛" upwardly therefrom. This rigid coupling of markers 140 to base 100 may be achieved by any suitable method, such as by first drilling a pilot holes along axis A—A and then carefully hammering markers 140 into the holes to achieve a secure force-fit of each marker 140 in base 100.

As will be further described in radiographic use of tool 10, a preferred uniform spacing between markers 140 is about ⅝", for radiograph visual clarity.

Figure 2:
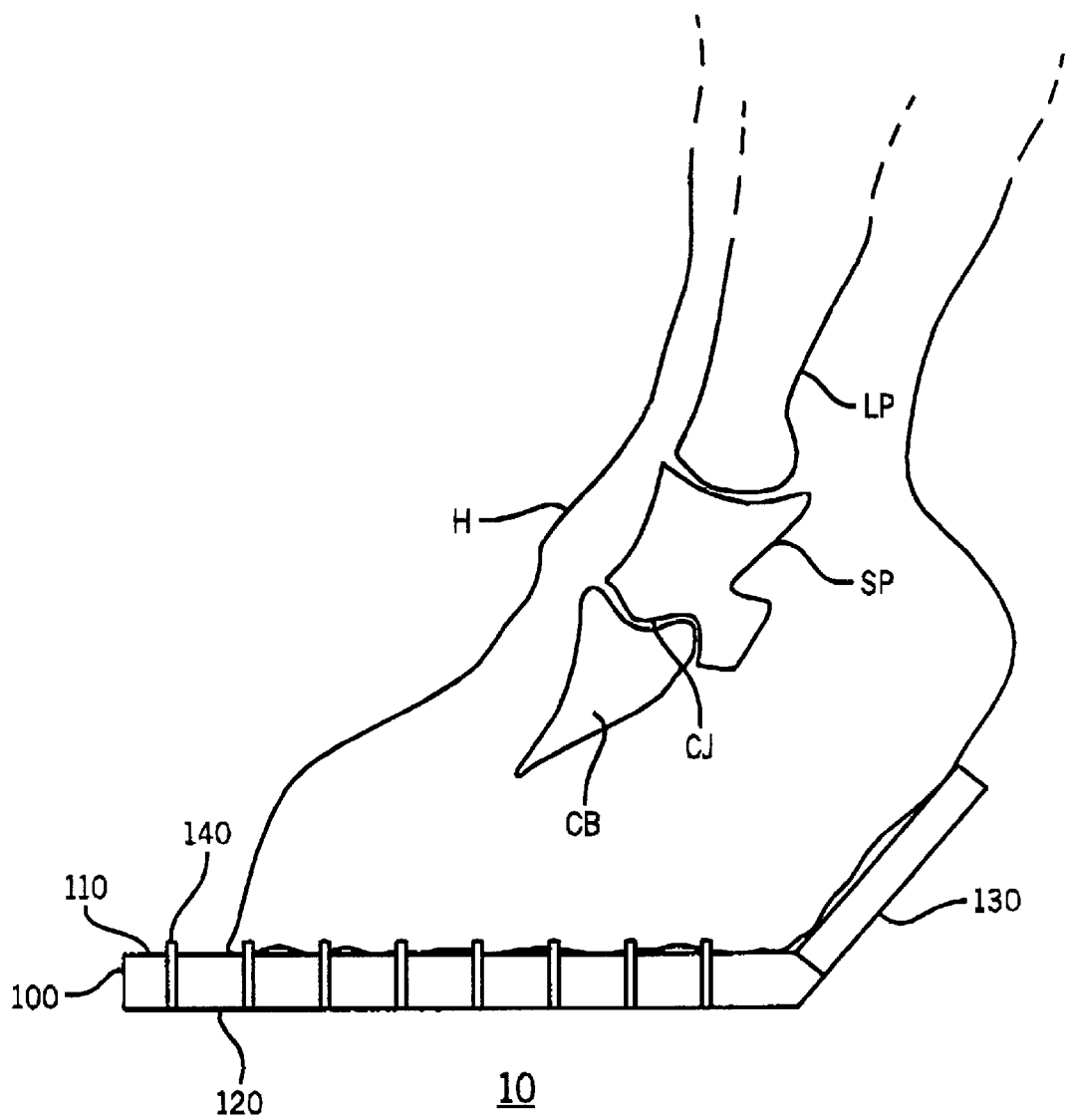
FIG. 2 is a representation of a side view radiograph image, depicting a hoof and its associated internal and skeletal structure resting on the diagnostic tool shown in FIG. 1.

Referring to FIG. 2, tool 10 is depicted in use. Therein, a representation of a side view radiograph image shows hoof H positioned and resting on base 100 of tool 10. Specifically shown in the radiograph image is hoof H and its internal and skeletal structure, including a long pastern LB, a short pastern SP, and a coffin bone CB. A coffin joint CJ exists between short pastern SP and coffin bone CB.

Also in FIG. 2, radio-opaque markers 140 are clearly visible. It is to be appreciated and understood that the radiographic image of hoof H including markers 140 provided by tool 10 enable accurate hoof measurements and location determinations to be obtained relative to the markers in the image. That is, such measurements and determinations may be made simply with reference to a particular marker 140, thereby making such tasks much less prone to subjective interpretation and error. For example, with reference to FIG. 2, if it is desired to change an angulation of coffin bone CB with respect to short pastern SP, as may be desired when laminitis is indicated in the image, then markers 140 may be sequentially referenced in a 1-2-3 numbering scheme for relatively precise determination of an area of hoof H to be trimmed and/or a determination of a particular shoeing provision. Accordingly, for example, a veterinarian could determine that an area of hoof H proximate to marker number 4 (as counted from heel member 130) requires trimming. Likewise, a crack occurring in hoof H proximate to a marker 140 could be identified, for corrective action by way of placement of a clip on a shoe in a location corresponding to the proximate marker 140.

As mentioned above, it has been determined through extensive experimentation and refinement of the present invention that a uniform spacing of about ⅝" between markers 140 is optimal for radiographic use of tool 10. Specifically, any spacing less than ⅝" tends to result in a blurry or indefinite radiographic image of markers 140.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

For example, with base 100 fabricated from a clear plastic, tool 10 could also be readily used in combination with a grease pencil or other non-permanent marker as a simple horseshoe template.

Additionally, although not illustrated, it is to be appreciated that a hinged tool 10 could be constructed from a first base 100 and a second base 100 joined by a hinge, with each base 100 including markers 140 (as shown in FIG. 1). In such an embodiment of the present invention, the second base 100 could be rotated about the hinge to rest against a top or front portion of a hoof, with markers 140 thereof projecting thereagainst the top or front hoof portion. Such a hinged tool 10 could be used for accurately locating a drill hole in the top or front hoof portion to relieve internal pressure caused by a hoof capsule.

It is to be particularly understood that any suitable alternatives may be employed to provide the diagnostic tool of the present invention, along with its method of use.

Lastly, the choice, of course, of compositions, sizes, and strengths of various aforementioned components of tool 10 are all a matter of design choice depending upon intended uses of the present invention. For instance, two tools 10 could be fabricated in accordance with the present invention; one in a large size and one in a smaller size, for use with a large animal such as a draft horse, and with a small animal such as a pony, respectively.

Accordingly, these and other various changes or modifications in form and detail of the present invention may also be made therein, again without departing from the true spirit and scope of the invention as defined by the appended claims.

What is claimed is:

1. A diagnostic tool for use in trimming and shoeing a hoof, comprising:
   a substantially planar base having a top surface and a bottom surface; and
   at least one radio-opaque marker rigidly coupled to said top surface of said base.

2. The diagnostic tool of claim 1, wherein the coupling of said at least one radio-opaque marker to said top surface is provided such that said at least one radio-opaque marker protrudes, at least in part, from said top surface.

3. The diagnostic tool of claim 1, further comprising a heel member coupled to said base, wherein the coupling of said heel member to said base is provided such that an angle of about 120 degrees is formed therebetween.

4. A diagnostic tool for use in trimming and shoeing a hoof, comprising:
- a substantially planar base having a top surface, a bottom surface, and a longitudinal centerline axis passing therethrough, said base being substantially axially symmetric about said longitudinal centerline axis;
- a heel member coupled to said base; and
- at least one radio-opaque marker rigidly coupled to said top surface of said base.

5. The diagnostic tool of claim 4, wherein said heel member is substantially axially symmetric about said longitudinal centerline axis of said base.

6. A method for use of a diagnostic tool, said diagnostic tool being adapted for use in trimming and shoeing a hoof, wherein said diagnostic tool includes a substantially planar base having a top surface and a bottom surface, and at least one radio-opaque marker rigidly coupled to said top surface of said base, said method comprising the steps of:
- positioning a hoof on said base, with the hoof resting on said top surface and a heel portion of the hoof placed against said heel member; and
- obtaining a side view radiographic image of the hoof positioned on said base, with said at least one radio-opaque marker being visible therein.

* * * * *

UNITED STATES PATENT AND TRADEMARK OFFICE
CERTIFICATE OF CORRECTION

PATENT NO.    : 6,502,642 B2
DATED         : January 7, 2003
INVENTOR(S)   : Ahrens, Gaylord L.

It is certified that error appears in the above-identified patent and that said Letters Patent is hereby corrected as shown below:

<u>Column 3,</u>
Line 40, "drilling a pilot holes" should read -- drilling pilot holes --.
Line 52, "LB" should read -- LP --.

Signed and Sealed this

Eleventh Day of March, 2003

JAMES E. ROGAN
*Director of the United States Patent and Trademark Office*